April 1, 1930.  L. KOLM  1,753,153
APPARATUS FOR THE WINDING OF ENDLESS BANDS
Filed Dec. 29, 1928
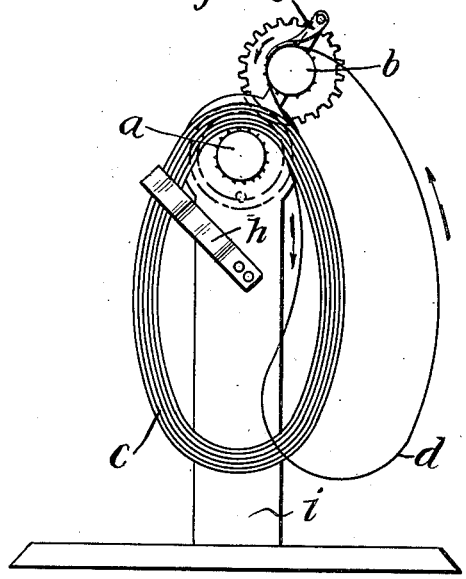
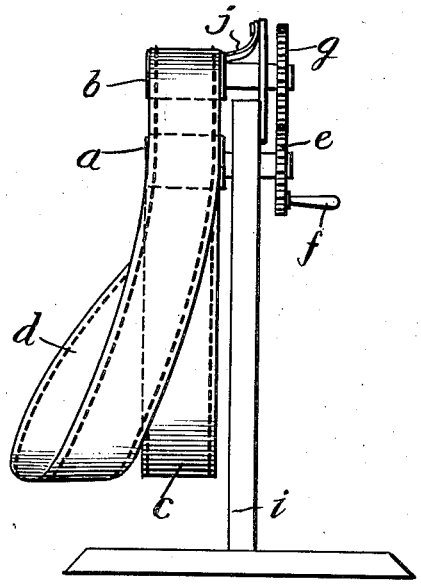
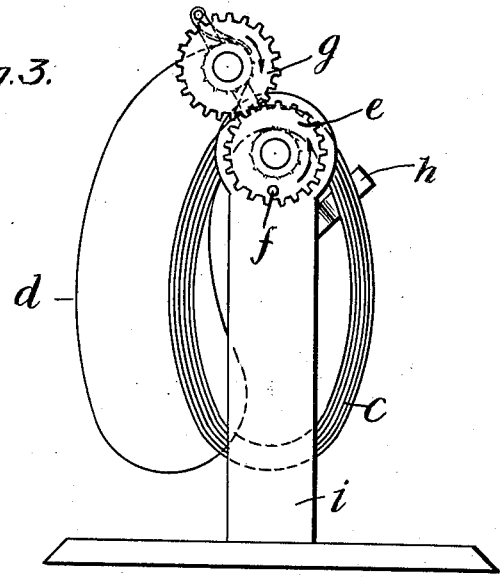
INVENTOR
Ludwig Kolm
BY Walton Harrison
ATTORNEY Patented Apr. 1, 1930

1,753,153

UNITED STATES PATENT OFFICE

LUDWIG KOLM, OF BERLIN, GERMANY, ASSIGNOR TO AKTIENGESELLSCHAFT "KOLMAG", OF GLARIS, SWITZERLAND

APPARATUS FOR THE WINDING OF ENDLESS BANDS

Application filed December 29, 1928, Serial No. 329,102, and in Germany February 13, 1928.

My invention relates to apparatus for the winding of endless bands, for instance films for moving-picture projection apparatus in which the same film is repeatedly moved past the lens.

More specifically my invention relates to apparatus of the aforementioned type for winding a longitudinally perforated endless band formed into a loosely wound multi-layered roll having a looped portion termed the "reach" extending from the inner to the outer periphery thereof.

It is an object of my invention to provide an endless band winding device of the type specified which is of extremely simple construction as compared to existing apparatus of this kind and which, due to the utilization of feed sprockets having teeth engaging the band perforations, feeds the band by positive action both unwinding and rewinding the same.

It is a further object of my invention to provide a device of the type specified wherein the winding operation is accomplished with a minimum of wear and tension upon the film thereby increasing its useful life beyond that attainable with existing apparatus of this type.

The invention is accomplished in part in that instead of supporting the film roll upon a plain cylinder or cylinders, it is supported upon a feed sprocket having teeth adapted to engage the film perforations. With such an arrangement the feed sprocket during rotation serves in the dual capacity of providing a positive feed for unreeling the film roll at its inner periphery, and also of producing a rotation of the entire film roll for rewinding the film at its outer periphery.

The invention in its complete form contemplates the use of a second feed sprocket situated adjacent the outer periphery of the film roll but in spaced relation thereto with the looped portion of film extending thereover to provide a positive feed action for returning the film to the roll. By further mechanically coupling the two feed sprockets in such manner that they are rotatable in opposite directions at the same peripheral speed, it is assured that as much film will be positively drawn off from the inside of the roll as is positively wound up upon the outside thereof, which action results in the inner and outer diameters of the film roll and the "reach" of film, i. e., the looped portion thereof, retaining substantial constancy during the winding operation.

Since the film roll normally rotates with the same angular velocity at its inner unreeling radius and at its outer reeling radius, normally more film would have to be wound up than is drawn off. As a result the film roll does not retain its constancy, since the inner radius keeps getting smaller and the outer radius grows steadily greater.

With the arrangement of the present invention, however, this action cannot occur, owing to the positive operation of the two feed sprockets which compel the film to be reeled and unreeled at the same rate. In this way the film roll is forced to compensate the stresses introduced therein due to the difference between the inner and outer diameters of the roll in that all of the layers of film are automatically displaced with respect to each other.

The feature of the present invention wherein the film roll is loosely suspended upon the inner feed sprocket facilitates this relative displacement of the various film layers; and further the action of the inner feed sprocket in rotating the entire film roll cooperating with the additional action of the outer feed sprocket in limiting the rate at which the film is reeled, sets up a slight tension in the film just sufficient to produce this necessary relative displacement.

In the drawings affixed to this specification and forming part thereof a film-winding apparatus embodying my invention is illustrated diagrammatically by way of example.

In the drawings,

Fig. 1 is a front elevation,

Fig. 2 is a side elevation, viewed from the right in Fig. 1, and

Fig. 3 is an elevation viewed from the right in Fig. 2.

Referring to the drawings, $a$ is the supply cylinder which, as distinguished from the normal cylinders referred to, is provided with teeth or projections for engaging the perforations in the band. $b$ is the winding drum, which is also provided with teeth or projections for engaging the band perforations, $c$ is the band roll supported on the supply cylinder $a$, its inner layers being engaged by the projections on the supply cylinder, and $d$ is the reach of film between the inner unreeling feed sprocket $a$ and the winding feed sprocket $b$. As will appear from Fig. 2, the reach is taken from the inside of the loop $c$ and moved past the projection apparatus (not shown) in case the band roll comprises motion picture film.

Any suitable means may be provided for imparting rotation to the feed sprockets $a$ and $b$, I prefer providing spur gears $e$ and $g$ of equal diameter on the spindles of the feed sprockets $a$ and $b$ and a handle $f$ of one of the gears, for instance $e$, so that uniform but opposite rotation at the same peripheral speed will be imparted to the two feed sprockets by rotating one of the gears, and the length of the reach $d$ from the feed sprocket $a$ to the feed sprocket $b$ remains constant.

A guide arm $h$ is loosely engaged by the loop $c$ and guided thereby, as the loop rotates step by step.

If desired, the feed sprockets $a$ and $b$ may be of different diameters, for instance the diameter of one feed sprocket may be such that it supports on its perimeter a length corresponding to eight images, and the other feed sprocket may be of such diameter as to support four images only. Obviously in this case the ratio of the gears $e$, $g$ must be selected in accordance with the different diameters of the feed sprockets, and in the present instance it will be 1:2 in order to cause the sprockets $a$ and $b$ to rotate at the same peripheral speed.

The guide arm $h$ affixed to the support $i$ serves to maintain the band layers constituting the roll in proper alinement during operation of the device. The band directing element $j$ associated with the outer feed sprocket $b$ forces the band to lie snugly against the sprocket during its passage thereabout, whereby the perforations of the band properly engage the sprocket teeth to ensure a positive feed action.

It will be noted that the two mechanically coupled feed sprockets $a$ and $b$ are the only movable elements required to make the machine completely operable. These two sprockets perform the functions of unreeling and simultaneously therewith reeling the band, of rotating the band roll in such manner and at such a rate as to facilitate the reeling and unreeling operation, and of automatically so regulating the dimensions of the band roll and of the looped portion as to maintain the same substantially constant during operation. This almost elementary simplicity of construction accomplishing, as it does, a multiplicity of functions is in marked contrast with the complicated structures of most existing devices of this class, and thus constitues one of the important features of the invention.

It is to be understood that the showing in the drawing of a handle $f$ for operating the device, is merely for purposes of simplicity in illustrating the principle of the invention. The invention, of course, contemplates the utilization of motor driving means for this purpose in the manner well known in the art.

I claim:

1. A device for winding an endless longitudinally perforated band formed into a multi-layered roll having a looped portion extending from the inner to the outer periphery thereof, comprising, a feed sprocket having teeth adapted to engage said perforations, means supporting said sprocket for freely suspending said roll therefrom with the teeth thereof engaging said perforations, whereby rotation of said sprocket feeds said band by positive action and rotates said roll to simultaneously unreel and reel said band, band directing means positioned in spaced relation to the outer periphery of said roll for returning said band thereto, and guide means for maintaining in alignment the band layers constituting said roll.

2. A device for winding an endless perforated band formed into a multi-layered roll having a looped portion extending from the inner to the outer periphery thereof, comprising, a plurality of feed sprockets having teeth adapted to engage said perforations for feeding said band by positive action, means positioning said sprockets for freely suspending said roll from at least one said sprocket with the teeth thereof engaging said perforations and with a second said sprocket in spaced relation to the outer periphery of said roll with said looped portion engaging the teeth thereof, band directing means for insuring such engagement, means for simultaneously rotating said plurality of sprockets at the same peripheral speed to simultaneously unreel and reel said band in equal amounts, and guide means for maintaining in alignment the band layers constituting said roll.

3. A device for winding an endless perforated band formed into a multi-layered roll having a looped portion extending from the inner to the outer periphery thereof, comprising, a pair of feed sprockets having teeth adapted to engage said perforations for feeding said band by positive action, means positioning said sprockets for freely suspending said roll from one said sprocket with the teeth thereof engaging said perforations and with said second sprocket in spaced relation to the outer periphery of said roll with said looped portion engaging the teeth thereof, band directing means for insuring such engagement, means for rotating said sprockets at the same peripheral speed to simultaneously unreel and reel said band at the same rate, and guide means for maintaining in alignment the band layers constituting said roll.

4. A device for winding an endless longitudinally perforated band formed into multi-layered roll having a looped portion extending from the inner to the outer perphery thereof, comprising, a pair of feed sprockets having teeth adapted to engage said perforations, means supporting said sprockets for freely suspending said roll from one said sprocket with the teeth thereof engaging said perforations, and with said second sprocket positioned in spaced relation to the outer periphery of said roll with said looped portion extending thereover, band directing means cooperating with said second sprocket to cause the teeth thereof to engage said band perforations, means for rotating said sprockets oppositely at the same peripheral speed whereby said band is positively fed from the inner periphery and positively reeled upon the outer periphery of said roll at the same rate, and guide means for maintaining in alignment the band layers constituting said roll.

5. A device for use in conjunction with a motion picture projector for winding an endless perforated film formed into a multi-layered roll, said device comprising a pair of feed sprockets having teeth adapted to engage said perforations for feeding said film by positive action, means positioning said sprockets for freely suspending said roll from one said sprocket with the teeth thereof engaging said perforations and with the second said sprocket situated in spaced relation to the outer periphery of said roll with said looped portion extending about the same, band directing means cooperating with said second sprocket to insure engagement of the teeth thereof with said film perforations, means for rotating said sprockets oppositely at the same peripheral speed to simultaneously unreel and reel said film at the same rate, and guide means for maintaining in alignment the film layers constituting said roll.

6. A device for winding an endless longitudinally perforated band formed into a multi-layered roll having a looped portion extending from the inner to the outer periphery thereof, comprising, a pair of feed sprockets having teeth adapted to engage said perforations, means supporting said sprockets for freely suspending said roll from one said sprocket with the teeth thereof engaging said perforations, and with said second sprocket positioned in spaced relation to the outer periphery of said roll with said looped portion extendng thereover, and means for rotating said sprockets oppositely at the same peripheral speed whereby said band is positively fed from the inner periphery and positively reeled upon the outer periphery of said roll at the same rate, and guide means for maintaining in alignment the band layers constituting said roll.

In testimony whereof I affix my signature.

LUDWIG KOLM.